US011879173B2

(12) United States Patent
Habel et al.

(10) Patent No.: US 11,879,173 B2
(45) Date of Patent: Jan. 23, 2024

(54) PRECISION AIR FLOW ROUTING DEVICES AND METHOD FOR THERMAL SPRAY COATING

(71) Applicant: Ford Motor Company, Dearborn, MI (US)

(72) Inventors: Michael J. Habel, Ann Arbor, MI (US); Michael Dennis Mucci, Lake Orion, MI (US); Ted A. Settimo, Macomb, MI (US); Timothy George Beyer, Troy, MI (US); Keith Alan Larson, Beverly Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/548,924

(22) Filed: Aug. 23, 2019

(65) Prior Publication Data

US 2019/0376172 A1 Dec. 12, 2019

Related U.S. Application Data

(62) Division of application No. 15/458,709, filed on Mar. 14, 2017, now Pat. No. 10,435,779.

(51) Int. Cl.

| | |
|---|---|
| ***C23C 4/131*** | (2016.01) |
| ***C23C 4/134*** | (2016.01) |
| ***B05B 5/12*** | (2006.01) |
| ***B05B 7/16*** | (2006.01) |
| ***B05C 11/06*** | (2006.01) |
| ***F02F 1/00*** | (2006.01) |

(52) U.S. Cl.
CPC ................ *C23C 4/134* (2016.01); *B05B 5/12* (2013.01); *B05B 7/16* (2013.01); *B05C 11/06* (2013.01); *C23C 4/131* (2016.01); *F02F 1/004* (2013.01); *F02F 1/00* (2013.01)

(58) Field of Classification Search
CPC ........... C23C 4/134; C23C 4/131; B05B 5/12; B05B 7/16; B05C 11/06; F02F 1/004; F02F 1/00
See application file for complete search history.

(56) References Cited

U.S. PATENT DOCUMENTS

| | | | | |
|---|---|---|---|---|
| 5,820,938 A * | 10/1998 | Pank | C23C 2/02 | 427/449 |
| 6,412,309 B1 * | 7/2002 | Kajii | C03B 27/0404 | 65/114 |
| 2006/0027205 A1 * | 2/2006 | Boehm | B23B 51/10 | 123/193.1 |
| 2006/0172066 A1 * | 8/2006 | Takahashi | C23C 4/16 | 427/236 |

(Continued)

FOREIGN PATENT DOCUMENTS

| | | | | |
|---|---|---|---|---|
| DE | 19705628 A1 * | 8/1998 | C23C 4/16 |
| JP | 2002-096034 * | 4/2002 | |

*Primary Examiner* — Katherine A Bareford
(74) *Attorney, Agent, or Firm* — Burris Law, PLLC

(57) ABSTRACT

A method of controlling deposition of material from at least one plasma transferred wire arc (PTWA) torch within at least one bore includes: directing a fluid through a duct; and directing the fluid through a number of cannons N disposed adjacent and downstream from the duct. The fluid is directed through the duct and N cannons and past the PTWA torch while the PTWA torch is spraying downstream from N−1 cannons.

18 Claims, 12 Drawing Sheets

(56) References Cited

U.S. PATENT DOCUMENTS

| | | | | |
|---|---|---|---|---|
| 2007/0130746 | A1* | 6/2007 | Sugiyama | B05B 13/06<br>29/458 |
| 2011/0065363 | A1* | 3/2011 | Kuroiwa | B24C 1/086<br>451/38 |
| 2013/0000550 | A1* | 1/2013 | Brown | B05B 7/224<br>118/301 |

* cited by examiner

Baseline Bore 5-8

| | Average Velocity (ft/min) |
|---|---|
| Bore# | Baseline |
| 1 | 1563 |
| 2 | 1623 |
| 3 | 1303 |
| 4 | 1088 |
| 5 | 1765 |
| 6 | 2352 |
| 7 | 2240 |
| 8 | 2280 |

| | |
|---|---|
| Average | 1777 |
| Std. Dev. | 473 |

FIG. 10

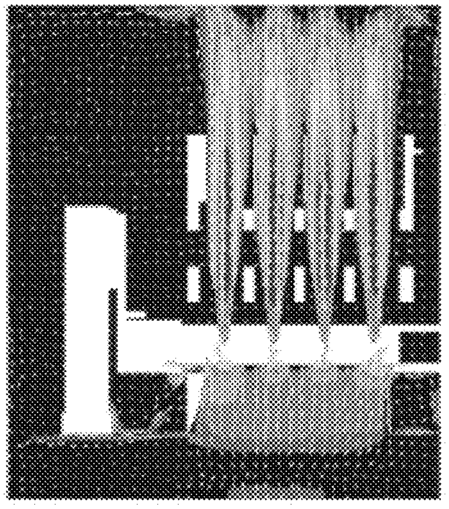
Chimney + Cannon Bore 5-8
FIG. 11
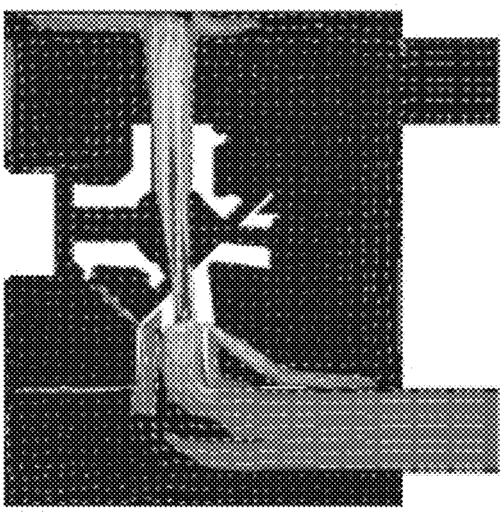
Chimney + Cannon Bore 5-8
FIG. 12
| | Average Velocity (ft/min) | |
|---|---|---|
| Bore# | Baseline | Chimney & Cannon |
| 1 | 1563 | 3323 |
| 2 | 1623 | 3280 |
| 3 | 1303 | 3253 |
| 4 | 1088 | 3253 |
| 5 | 1765 | 3275 |
| 6 | 2352 | 3213 |
| 7 | 2240 | 3193 |
| 8 | 2280 | 3159 |
| Average | 1777 | 3244 |
| Std. Dev. | 473 | 53 |
FIG. 13

PRECISION AIR FLOW ROUTING DEVICES AND METHOD FOR THERMAL SPRAY COATING

CROSS-REFERENCE TO RELATED APPLICATION

This application is a divisional application of U.S. Ser. No. 15/458,709, filed Mar. 14, 2017, now U.S. Pat. No. 10,435,779, and titled "Precision Air Flow Routing Devices and Method for Thermal Spray Coating Applications," the content of which is incorporated herein in its entirety.

FIELD

The present disclosure relates generally to a thermal spray coating apparatus for coating a surface, and more particularly to a thermal spray coating apparatus for applying a coating on a cylinder bore surface of an internal combustion engine.

BACKGROUND

The statements in this section merely provide background information related to the present disclosure and may not constitute prior art.

Thermal spraying a metal powder, droplets and other comminuted particles/material onto cylinder bores surfaces of an engine block is known in the art. The wear-resistant coatings on the cylinder bore surfaces enable the use of aluminum, instead of heavy cast iron, to form the engine blocks. During the thermal spraying process, a gun nozzle is stationed relatively close to the bore surface due to the restricted diameter of conventional cylinder bores and sprays the metal powder, droplets or comminuted particles at very high velocities onto the cylinder bore surface. The relatively wide and uncontrollable spray pattern may result in non-uniform coating on the cylinder bore surface. More specifically, if a particle departs from its intended surface of deposition, it may become entrained onto the cylinder bore coating and cause iron oxide formations which may be detrimental to engine performance.

On the other hand, a beneficial iron oxide material may be formed in the coating during the thermal spraying process. After the thermal spray process, the cylinder bores generally undergo other processes, such as boring, washing and honing. These processes are likely to remove the iron oxide material from the thermal-sprayed coating, leaving voids in the coating. A cylinder block with voids on cylinder bore surfaces has oil consumption and emission issues, and thus may be scrapped, thus leading to operational inefficiencies, repair/warranty issues, and increased costs.

SUMMARY

In one form, a method of controlling deposition of material from at least one plasma transferred wire arc (PTWA) torch within at least one bore is provided, which includes directing a fluid through a duct, and directing the fluid through a number of cannons N disposed adjacent and downstream from the duct. The fluid is directed through the duct and N cannons and past the PTWA torch while the PTWA torch is spraying downstream from N−1 cannons.

In other features, the method further includes: moving the duct and cannons to a standby position while positioning a second duct and a second number of cannons N' to an active position. The moving is one of a rotational and translational movement. The flow of fluid is drawn from the duct and the cannons through a number of bores defined by "B" while the PTWA torch is spraying in a number of bores defined by B−1.

In another form, a method of controlling deposition of material from at least one plasma spraying torch is provided. The method includes: directing a fluid through a duct; and directing the fluid through a number of cannons N disposed adjacent and downstream from the duct. The fluid is directed through the duct and the cannons and past the torch while the torch is spraying a surface downstream from N−1 cannons.

In still another form, a method of applying a coating on a surface of a bore is provided. The method includes: applying, by a torch, the coating on the surface of the bore; directing a fluid through a duct; and directing the fluid through a plurality of cannons disposed adjacent and downstream from the duct. The fluid is simultaneously directed through the duct and all of the plurality of cannons to the bore toward the coating when the torch is applying the coating on the surface of the bore.

In other features, the fluid is a gas consisting of air. The step of directing the fluid through the duct includes directing the fluid through a plurality of fluid passageways separated by cross-members in the duct. Only one of the plurality of cannons is inserted into the bore. The bore is one of a plurality of bores in an engine block. The plurality of passageways correspond to the plurality of cannons.

The method further includes: dividing the fluid into a plurality of flows by the duct outside the bore, and directing the fluid through the plurality of cannons into a plurality of bores after the fluid is divided by the plurality of fluid passageways. The plurality of flows divided by the duct are directed into the plurality of cannons after the fluid is divided by the plurality of fluid passageways.

The method further includes: rotating the plurality of cannons to position the plurality of cannons relative to the torch, and inserting the torch from one of the opposing ends of the bore, and inserting one of the plurality of cannons from the other one of the opposing ends of the bore; spraying the coating on a surface of N−1 bores; and directing the fluid through N cannons.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 10 is a table of experimental data of average velocity of air flow in two banks of cylinder bores;

FIG. 11 is a thermal image of a front of a bank of four cylinder bores, showing gas air flow in the cylinder bores when an air flow device is used;

FIG. 12 is a thermal image of a side of the bank of four cylinder bores of FIG. 11;

FIG. 13 is a table of experimental data comparing average velocity of air flow in two banks of cylinder bores, when an air flow device is and is not used;

Corresponding reference numerals indicate corresponding parts throughout the several views of the drawings.

DETAILED DESCRIPTION

The following description is merely exemplary in nature and is not intended to limit the present disclosure, application, or uses.

Figure 1:
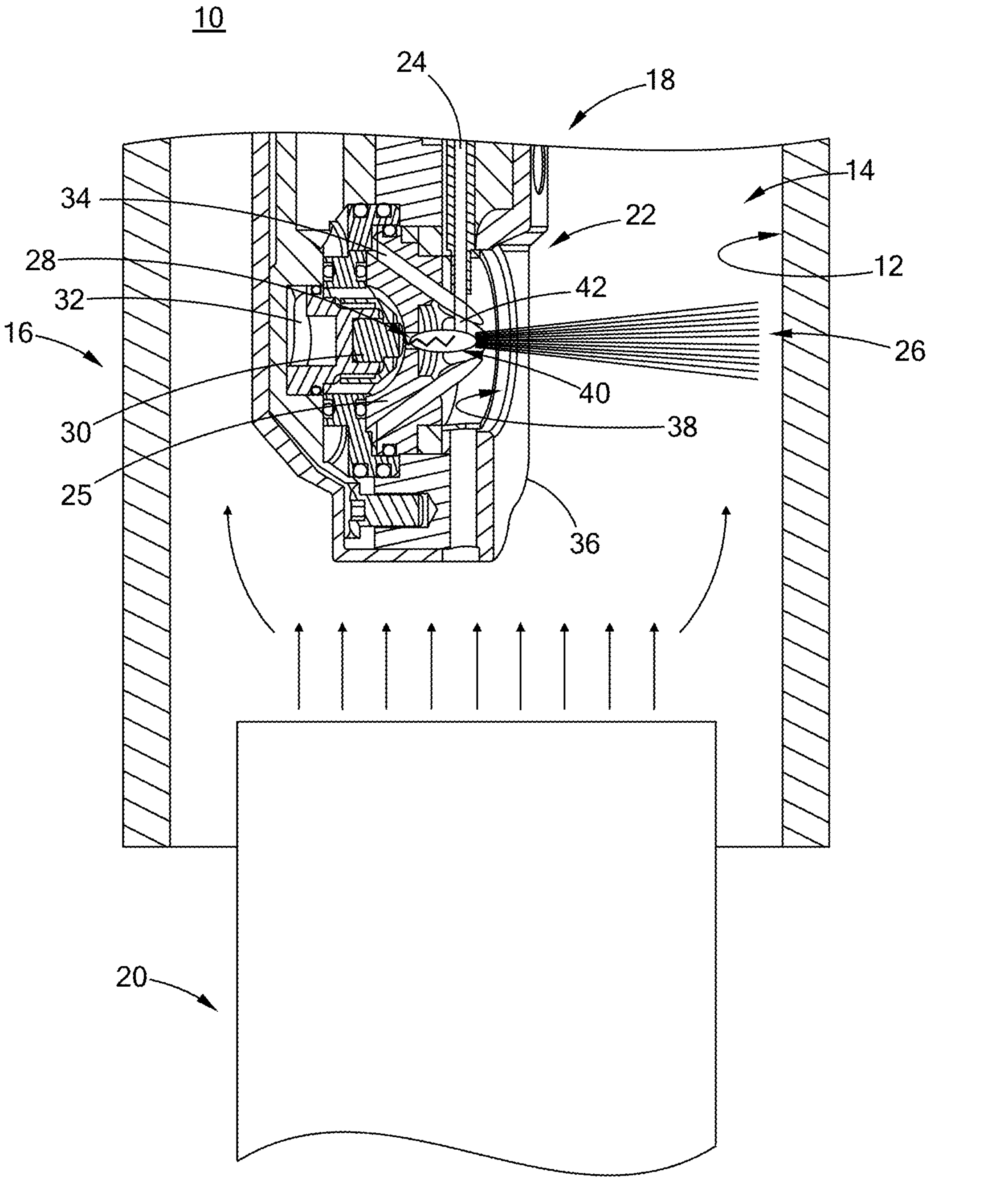
FIG. 1 is a schematic cross-sectional view of a thermal spray coating apparatus for applying a coating to an interior surface of a cylinder bore of an engine block constructed in accordance with the teachings of the present disclosure.

Referring to FIG. 1, a thermal spray coating apparatus 10 constructed in accordance with the teachings of the present disclosure is configured to apply a coating onto an interior surface 12 of a cylinder bore 14 of an engine block 16 or any surface of a powertrain component. The thermal spray coating apparatus 10 includes a thermal spray device 18 and an air flow device 20. The thermal spray device 18 may be a plasma transferred wire arc (PTWA) torch in one form of the present disclosure. Only a torch head 22 of the PTWA torch is shown in FIG. 1. The torch head 22 of the PTWA torch is inserted into the cylinder bore 14 to inject a particle stream 26 onto the interior surface 12 of the cylinder bore 14, thereby forming a coating onto the interior surface 12. The torch head 22 is generally mounted onto a rotating spindle (not shown) and is rotatable to adjust the spray direction of the particle stream 26.

The torch head 22 includes a consumable wire 24 as a first cathode, a nozzle 25 having a nozzle orifice 28, a second cathode 30 disposed inside the nozzle 25 and adjacent the nozzle orifice 28, a plasma gas stream 32, a secondary gas stream 34, and a housing 36 for receiving these components therein. The housing 36 defines an opening 38 aligned with the nozzle orifice 28.

In operation, the plasma gas stream 32 exits the nozzle orifice 28 as a plasma jet 40 at high velocity. The plasma jet 40 or an arc is generated between a free end 42 of the consumable wire 24 and the second cathode 30, thereby completing an electric circuit. The plasma jet 40 or the arc is used as a heat source to melt the free end 42 of the wire 24. The wire 24 is continuously fed into the heat source to form molten droplets. The plasma jet 40 causes the melted wire material or molten droplets to be transported toward the interior surface 12 to the cylinder bore 14.

The secondary gas stream 34 is provided around the plasma jet 40, works as secondary atomizer of the molten droplets formed from the wire 24, and transfers the droplets as a particle stream 26 onto the interior surface 12 of the cylinder bore 14. The secondary gas stream 34 also functions to cool the consumable wire 24 and the nozzle 25.

The air flow device 20 is disposed under the torch head 18 of the PTWA torch and has a portion inserted into the cylinder bore 14 to direct air flow through the cylinder bores 14. The air flow directed from the air flow device 20 helps control deposition of particles/material in the particle stream 26 onto the interior surface 12 of the cylinder bores 14. The air flow device 20 directs an air flow, such as by blowing, pushing, drawing, or sucking an air, in a direction vertical to the particle stream 26 and parallel to the interior surface 12 of the cylinder bores 14.

Figure 2:
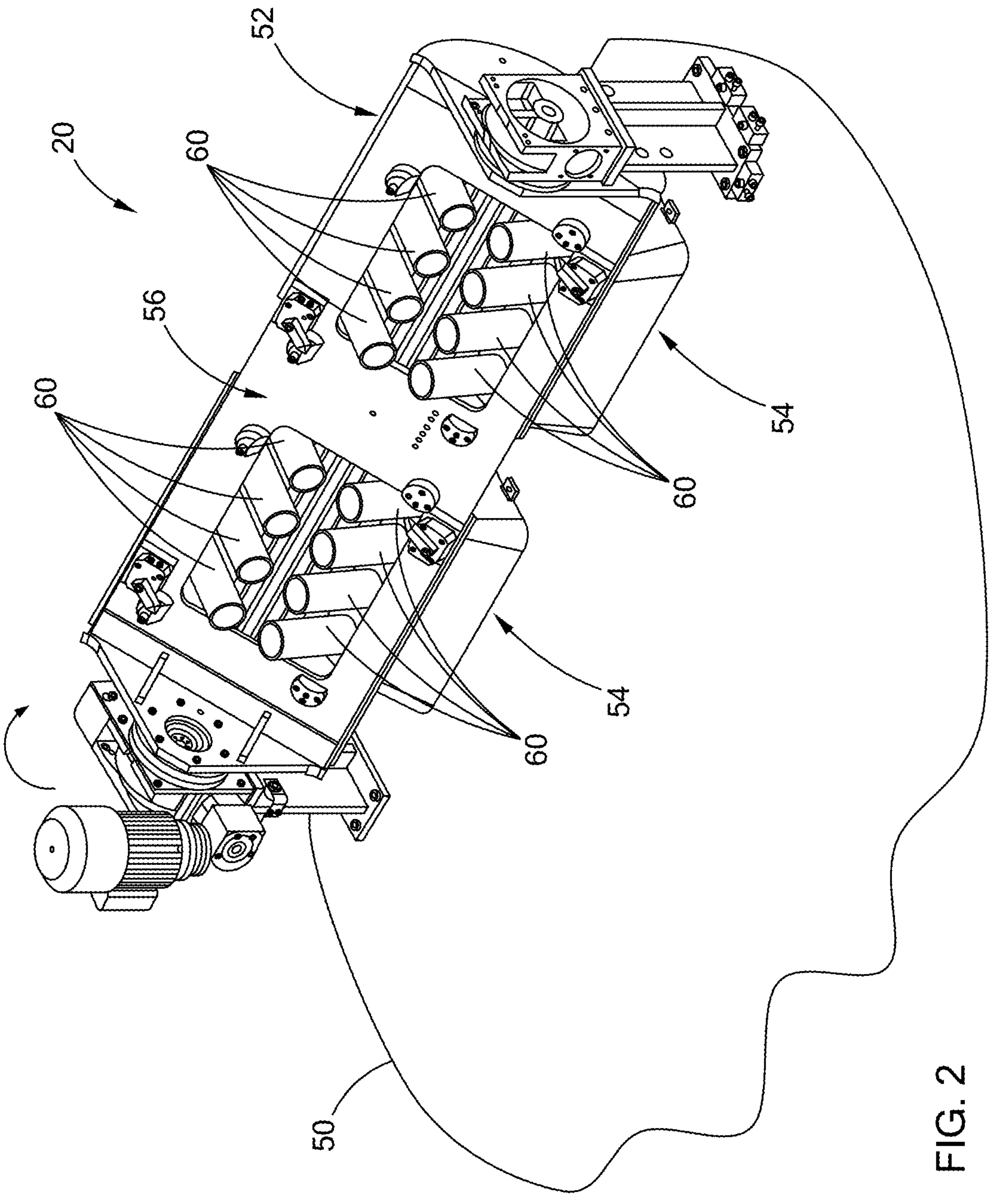
FIG. 2 is a front perspective view of an air flow device constructed in accordance with the teachings of the present disclosure.
Figure 3:
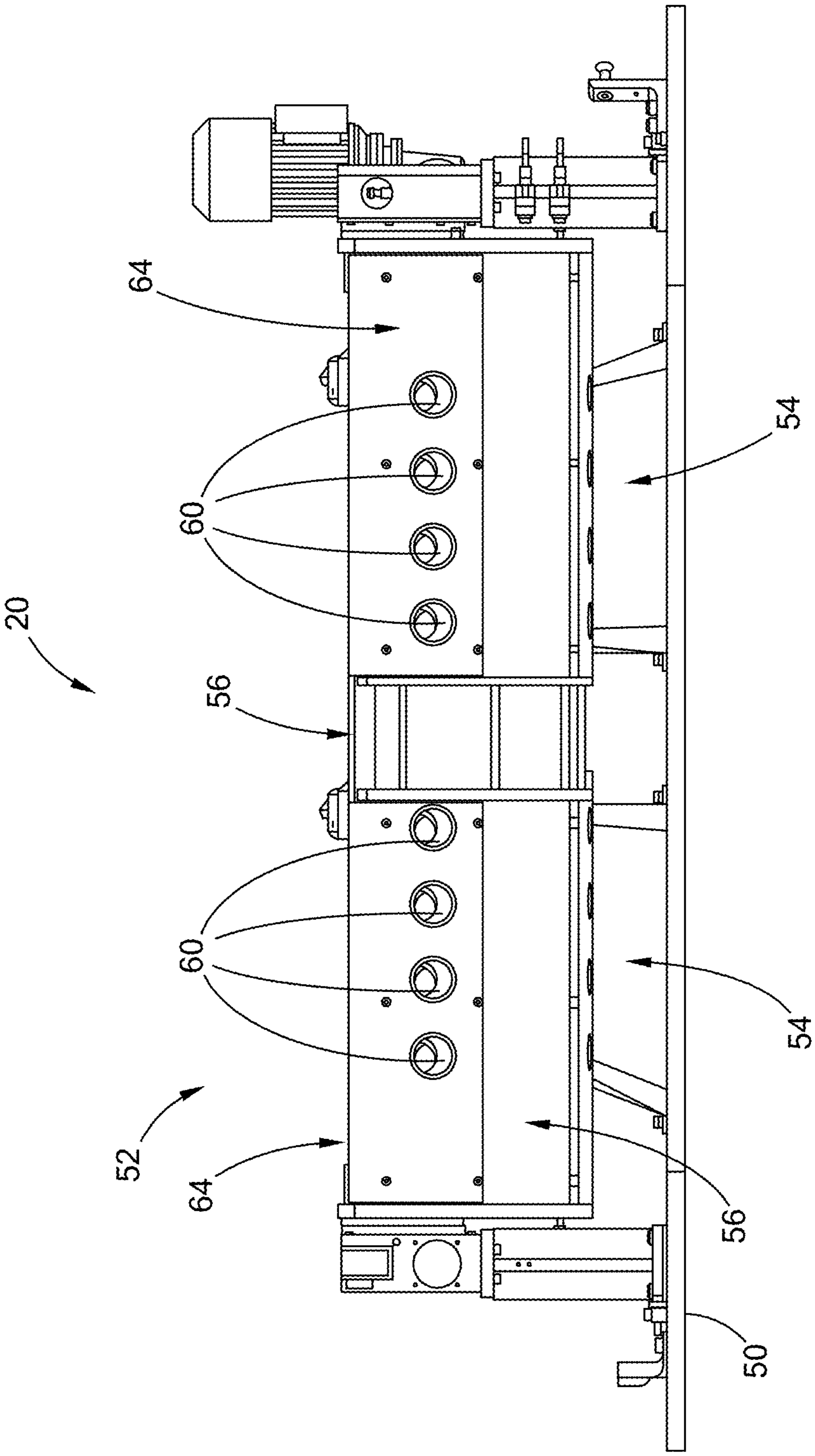
FIG. 3 is a rear view of the air control device of FIG. 2.

Referring to FIGS. 2 and 3, the air flow device 20 is shown to be mounted on a base plate 50. The air flow device 20 includes a cannon assembly 52 and at least one duct 54 disposed under the cannon assembly 52. The cannon assembly 52 includes a mounting structure 56 and a plurality of cannons 60 mounted thereon. The cannons 60 have an outside diameter smaller than the inside diameter of the cylinder bores 14 so that the cannons 60 could be inserted into the cylinder bores 14.

The plurality of cannons 60 may be arranged into two groups. Each group of cannons 60 have eight cannons 60 arranged into two rows for a V8 engine block. Each group of cannons 60 are associated with one duct 54 disposed under the cannons 60. The cannon assembly 52 is rotatable to make one row of cannons 60 aligned with the duct 54 during the thermal spray process. By providing two groups of cannons 60, the air flow device 20 of the present disclosure as shown in FIG. 2 allows for thermal spraying a coating onto cylinder bores 14 of two engine blocks 16 at the same time, one group of cannons 60 for one engine block 16. However, only one group of cannons 60 and only one duct 54 are needed for coating the cylinder bores 14 of a V8 engine block. It is also understood that the cannon assembly 56 may be configured to have only one group of four cannons 60 in the same row for an in-line four cylinder engine block, or may be configured for any number of cylinders and their arrangement within an engine block.

Figure 4:
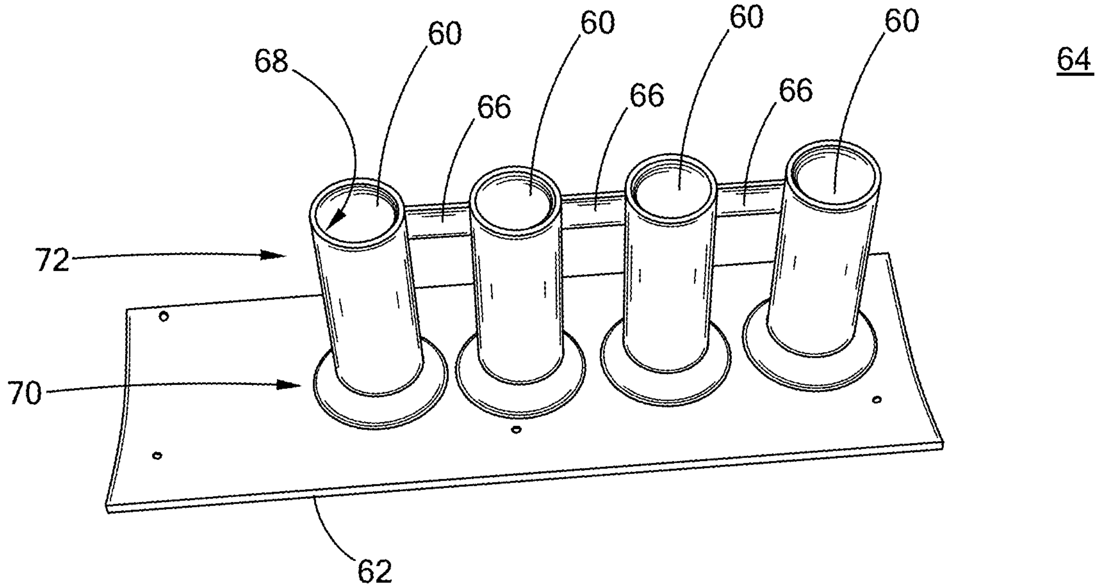
FIG. 4 is a perspective view of a cannon component of an air flow device constructed in accordance with the teachings of the present disclosure.
Figure 5:
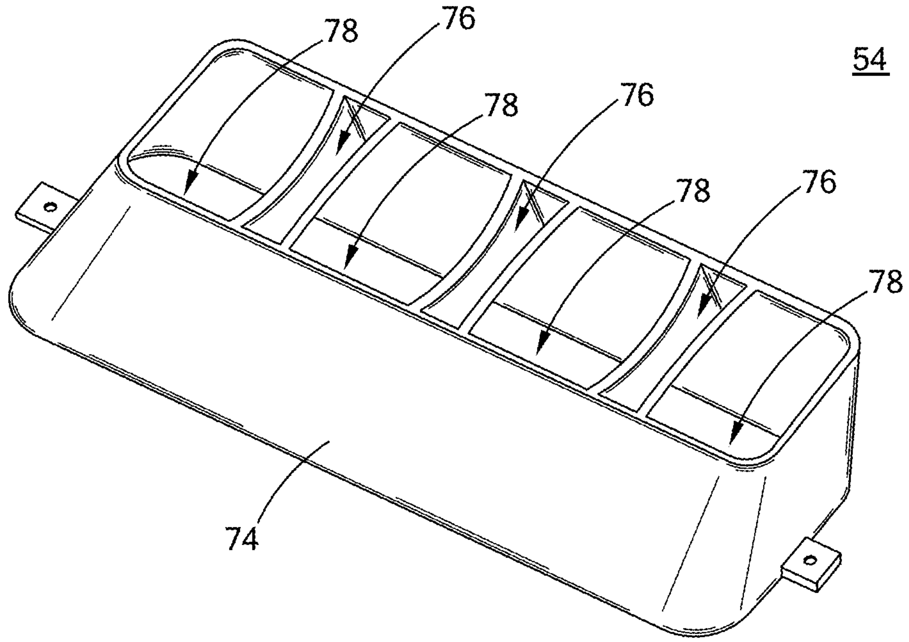
FIG. 5 is a perspective view of a duct of an air flow device constructed in accordance with the teachings of the present disclosure.

Referring to FIGS. 4 and 5, an integral, one-piece, replaceable cannon component 64 is shown to include a support plate 62, the plurality of cannons 60 extending from a surface of the support plate 62, and a plurality of connecting members 66 connecting between the plurality of cannons 60. The cannon component 64 is mounted to the mounting structure 56 of the cannon assembly 52. The cannons 60 are in the form of pipes defining air conduits 68. The plurality of cannons 60 each include a base portion 70 connected to the support plate 62 and an exit portion 72 which is the free end of the cannons 60. The plurality of cannons 60 are configured such that the length and the cross-sectional area thereof is configured to provide a laminar flow at an exit portion 72 of each of the plurality of cannons 60. The laminar flow helps control stability of the particle stream 26 from the torch head 22 of the PTWA, thereby improving uniformity of coating on the interior surface 12 of the cylinder bores 14. While the cannon component 64 is shown to include four cannons 60, the cannon component 64 can have any number of cannons 60 without departing from the scope of the present disclosure.

The plurality of cannons 60 each define a constant cross-sectional area along a majority of a length of each cannon, except for the exit portion 72. The exit portion is the portion closest to the PTWA torch and has a cross-sectional area that is smaller than a cross-sectional area of an entrance to the cylinder bore 14. Therefore, the cannons 60 may be inserted into the corresponding cylinder bores 14 to direct gas through the cylinder bores 14 when the PTWA torch applies the particle stream 26 onto the interior surface 12 of one or more of the cylinder bores 14.

Referring to FIG. 5, the duct 54 includes a hollow body 74 and a plurality of cross-members 76 dividing the hollow body 74 into a plurality of air passageways 78. The number of the plurality of fluid passageways 78 of the duct 54 is equal to the number of the cannons 60 in the same row in each group.

Figure 6:
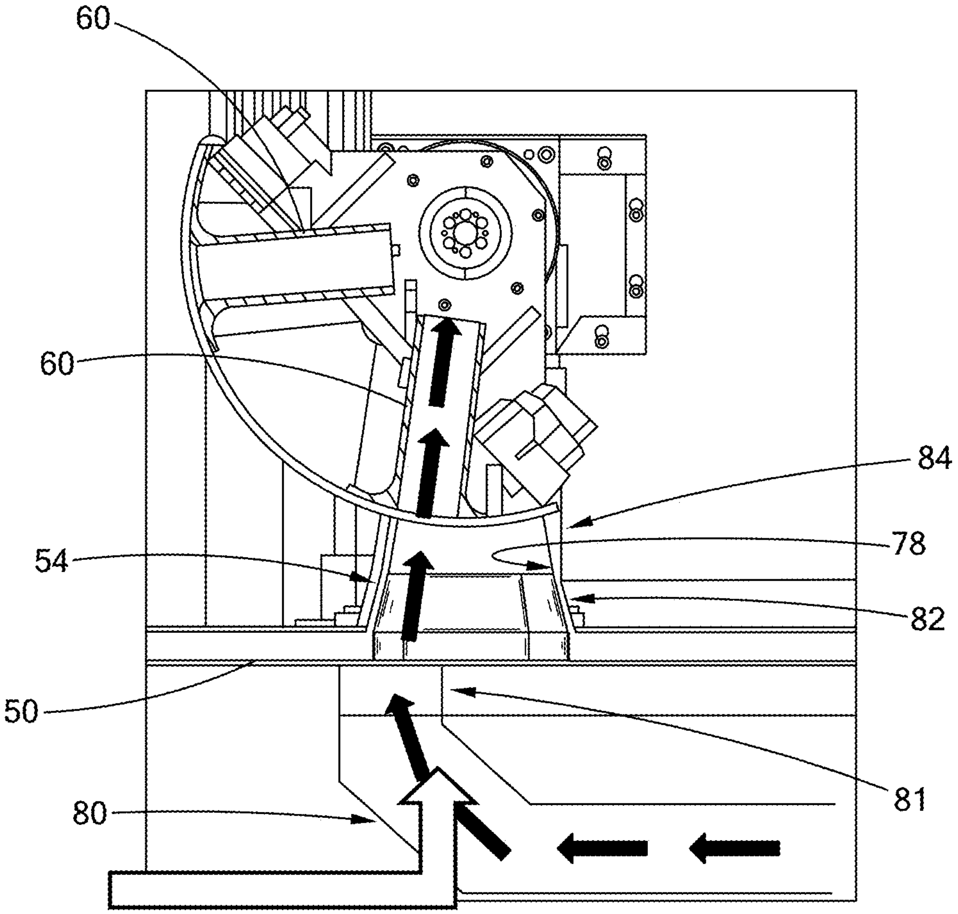
FIG. 6 is a partial cross-sectional view of an air flow device of FIG. 2.
Figure 7:
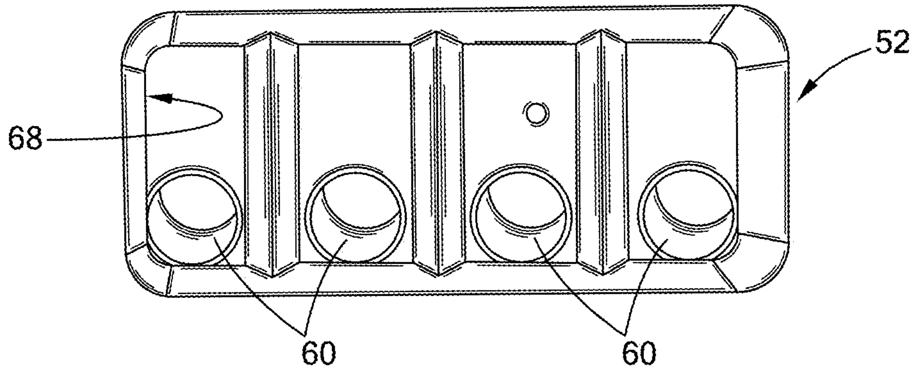
FIG. 7 is a bottom view of an enlarged portion A of the air flow device of FIG. 6.

Referring to FIGS. 6 and 7, in operation, the cannon assembly 52 is rotated such that one row of cannons 60 in each group are disposed immediately above the duct 54 and are aligned with the air passageways 78 of the duct 54. A main air channel 80 having an exit end 81 is disposed under the base plate 50 to supply air through the duct 54, through the cannons 60, to the cylinder bores 14 (shown in FIG. 1). The cannons 60 are inserted into the cylinder bores 14 of the engine block 16, as shown in FIG. 1. During thermal coating process, the torch head 22 of the PTWA torch is inserted into only one of the cylinder bores 14 and applies a particle stream 26 toward the interior surfaces 12 of the one of the cylinder bores 14 of the engine block. The torch head 22 sprays the particle stream 26 to the cylinder bore surface one by one until all the cylinder bore surfaces have been coated. However, all of the plurality of cannons 60 in the same row are inserted into the cylinder bores 14, and a flow of fluid is simultaneously directed through all of the fluid passageways 78 of the duct 54, through all of the cannons 60 in the same row, and to all of the cylinder bores 14 in the same row/bank. In other words, a portion of the flow of fluid is directed to the cylinder bore where the torch head 22 is disposed, while another portion of the flow of fluid is directed to the cylinder bores 14 where no torch head 22 is disposed. The portion of the flow of fluid is directed to the cylinder bore 14 where the torch head 22 is disposed and past the torch head 22 of the PTWA torch that is disposed downstream of the flow of fluid from the air flow device 20.

Alternatively, the PTWA may spray a coating onto interior surfaces 12 of a number of cylinder bores 14 fewer than a total number of the cylinder bores in the same row at the same time, while the air flow device 20 simultaneously directs air flow to all of the cylinder bores 14 in the same row. For example, when fluid is directed through the duct 54 and N cannons 60, the PTWA torch is spraying a coating downstream from N−1 cannons. The number of cannons 60 where air is directed through is fewer than the number of cylinder bores surfaces that are being coated by the PTWA. By directing the flow of fluid to all of passageways 68 of the duct 54, through all of the cannons 60 in the same row, and to all of the cylinder bores 14 in the same bank/row, the air flow can be more uniformly distributed in the cylinder bores 14.

After the interior surfaces 12 of all of the cylinder bores 14 in the same bank are applied with a coating, the cannon assembly 52 may be rotated such that the other row of cannons 60 may be rotated to be aligned with the air passageways of the duct 54 and be inserted into corresponding cylinder bores 14 of the other bank.

As further shown in FIG. 6, the duct 54 has an upstream end 82 adjacent to the base plate 50 and a downstream end 84 distal from the base plate 50. The plurality of fluid passageways 78 of the duct 54 define a smaller cross-sectional area at the downstream end 84 relative to an upstream end 84. As further shown in FIG. 7, the total cross-sectional area of the duct 54 is greater than a total cross-sectional area of the cannons 60 in the same row.

Figure 9:
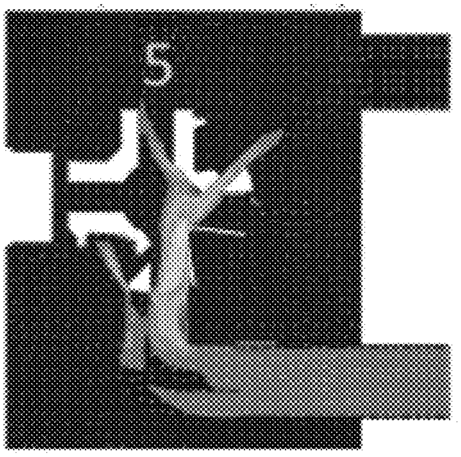
FIG. 9 is a thermal image of a side of the bank of four cylinder bores of FIG. 8.
Figure 8:
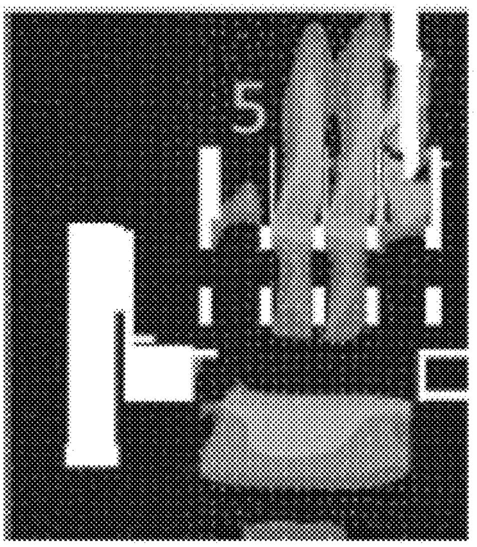
FIG. 8 is a thermal image of a front of a bank of four cylinder bores, showing air flow in the cylinder bores when no air flow device is used.

Referring to FIGS. 8 and 9, velocity contour plots of air flowing through cylinder bores #5 to #8 are shown. The air flowing through the cylinder bore 14 helps guide, distribute, and spread the particles in the particle stream 26 along the interior surfaces 12 of the cylinder bores 14. The direction of the air flowing through the cylinder bores 14 is affected by the air from the air flow device 20, the secondary gas stream 34 from the torch head 22, and the particle stream 26 from the torch head 22. When the air flow in the cylinder bores 14 is more turbulent, the particles in the particle stream 26 are less likely to be evenly spread onto the interior surface 12. When the air flow is more laminar, the particles in the particle stream 26 can be more evenly spread onto the interior surface 12 to reduce the formation of iron oxide material or generation of voids in the coating.

The velocity contour plots show, when no air flow device is used, the air flow is not laminar and is not uniform through cylinder bores #5 to #8. Air leaks occurs in areas where openings/cavities exist. Moreover, more air flows through cylinder bores #6 and #7 located in the middle of the cylinder bank and less air flows through cylinders #5 and #8 located adjacent ends of the cylinder bank.

Referring to FIG. 10, the average velocity of the air flowing through cylinder bores #1 to #8 is shown in the table. The data are consistent with the velocity contour plots of FIG. 8, which shows more air flow through the cylinder bores #2 and #3 and cylinder bores #6 and #7 in the middle of the cylinder banks at higher velocity and less air flow through cylinder bores #5 and #8 adjacent to ends of the cylinder banks at relatively lower velocity. The relatively lower velocity of air flow in the cylinder bores 14 causes less optimum spread of particles onto the interior surface 12 of the cylinder bores 14 and increase the likelihood of generation of voids in the coating. The average velocity of air in cylinder bores #1 through #8 is 1777 ft/min, and the standard deviation for the eight (8) velocity measurement is 473.

Referring to FIGS. 11 and 12, velocity contour plots of the air flowing through the cylinder bores #5 to #8 are shown when an air flow device 20 of the present disclosure is used. The thermal image of FIG. 11 shows the air flowing in cylinder bores #5 to #8 is laminar and uniform. The thermal image of FIG. 12 shows no undesirable air leak occurs.

Referring to FIG. 13, a table includes experimental data comparing average velocity of air flow in cylinder bores #1 to #8 when an air flow device 20 according to the present disclosure is or is not used. Data in the left column of the table are average velocity of air flow in cylinder bores #1 to #8 when the thermal coating process is performed without using an air flow device 20 of the present disclosure. Data in the right column of the table are average velocity of air flow in cylinder bores #1 to #8 when the thermal coating process is performed with the air flow device 20 disposed under the engine block. The experimental data also show the average velocity of the air flow in each cylinder when the air flow device 20 is used is significantly higher than that when the air flow device 20 is not used. Moreover, the average velocity of the air flow in cylinder bores #1 to #8 is more consistent and do not vary significantly with locations of the cylinder bores when the air flow device 20 is used.

Figure 14:
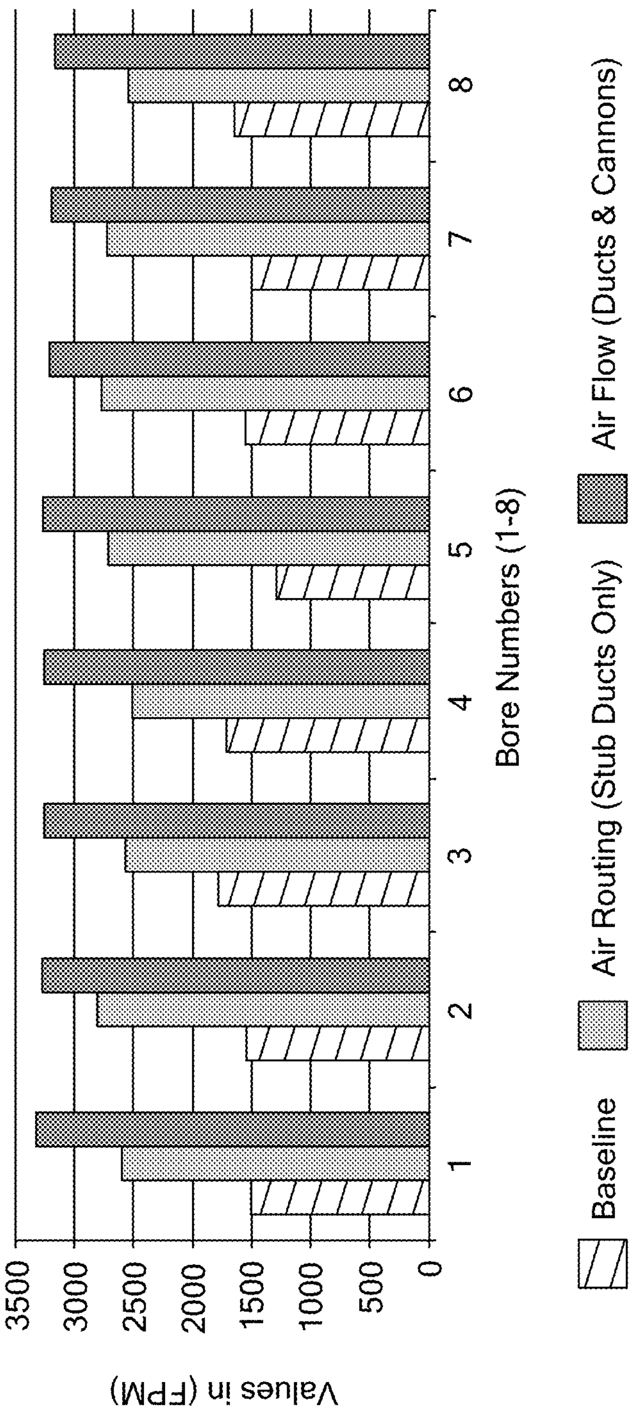
FIG. 14 is a bar chart comparing average velocity of air flow in two banks of cylinder bores #1 to #8, (1) when no air flow device is used, (2) an air flow device of the present disclosure is used, and (3) when an alternative air flow device having only ducts, but no cannons, is used.

Referring to FIG. 14, a bar chart represents the velocity of air flow in cylinder bores #1, #2, #3 . . . , and #8 for a thermal spray system (1) without using any duct and cannons to direct air flow into the cylinder bores, (2) using only a duct, but no cannons to direct air flow into the cylinder bores, and (3) using an air flow device including at least one duct and a plurality of cannons to direct air flow into the cylinder bores. It is shown when an air flow device 20 is used, the velocity of air in the cylinder bores is more than doubled the velocity of air flow without using any means to direct air through the cylinder bores during the thermal spray process. When only a duct is used and no cannons are provided, the velocity of air flow in the cylinder bores is also lower than that when both duct and cannons are used.

Figure 15:
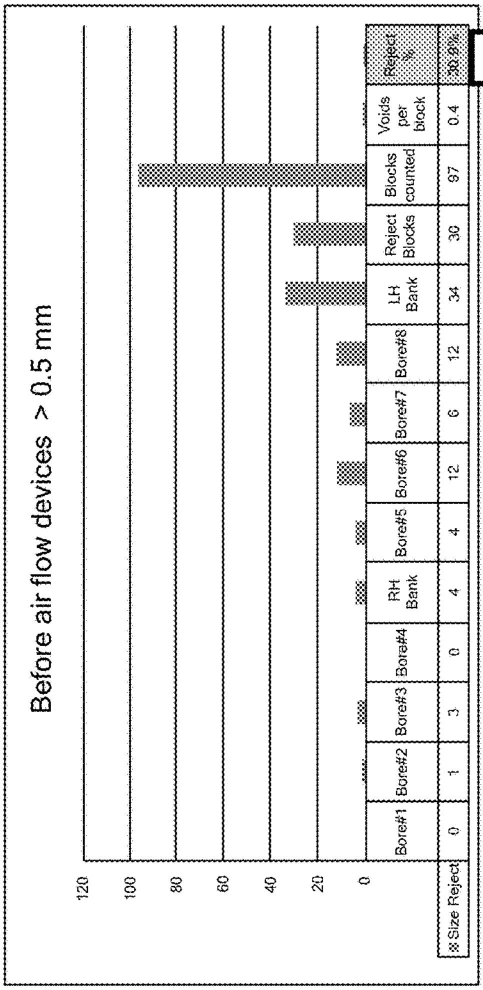
FIG. 15 is a bar chart showing occurrence rate of voids in a final bore surface of two banks and the rejection rate without using any air flow device, with a size of a rejection being greater than 0.5 mm.
Figure 16:
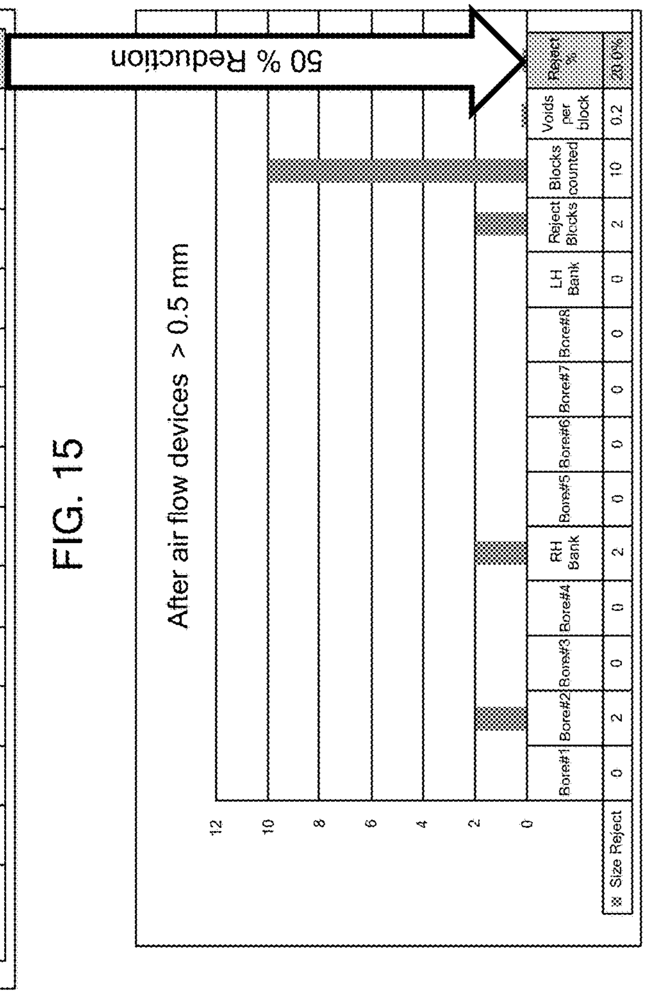
FIG. 16 is a bar chart showing occurrence rate of voids in a final bore surface of two banks and the rate of rejection when an air flow device of the present disclosure is used, with a size of a rejection being greater than 0.5 mm.

Referring to FIGS. 15 and 16, a comparison of the occurrence of voids in each engine block and the rate of scraped engine block between a thermal spray process using or not using the air flow device of the present disclosure is shown. FIG. 15 shows data for engine blocks when no air flow device is used, whereas FIG. 16 shows data for engine blocks when air flow device of the present disclosure is used. In FIGS. 15 and 16, with a size of a rejection being greater than 0.5 mm. As clearly shown in FIGS. 15 and 16, the rejection rate is reduced from 30.9% to 20.0%.

Figure 17:
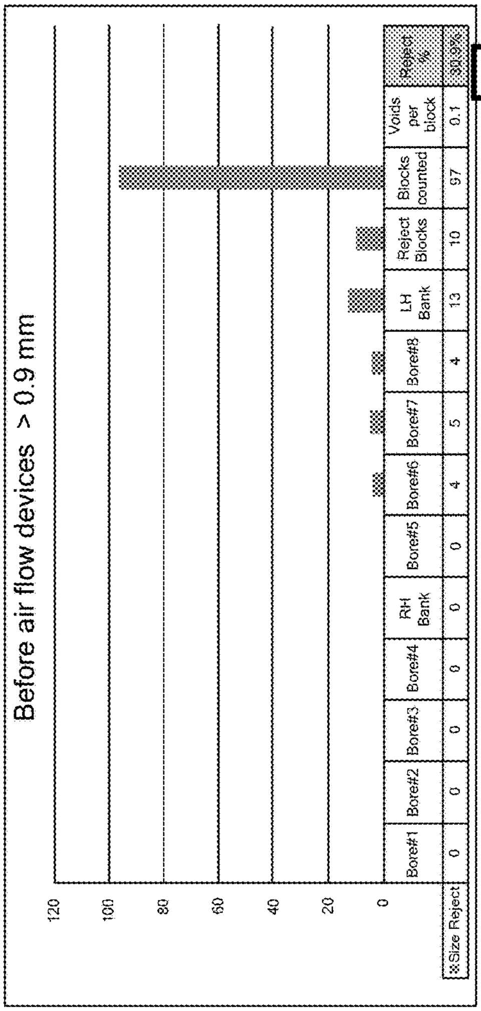
FIG. 17 is a bar chart showing occurrence rate of voids in a final bore surface of two banks and the rejection rate without using any air flow device, with a size of a rejection being greater than 0.9 mm.
Figure 18:
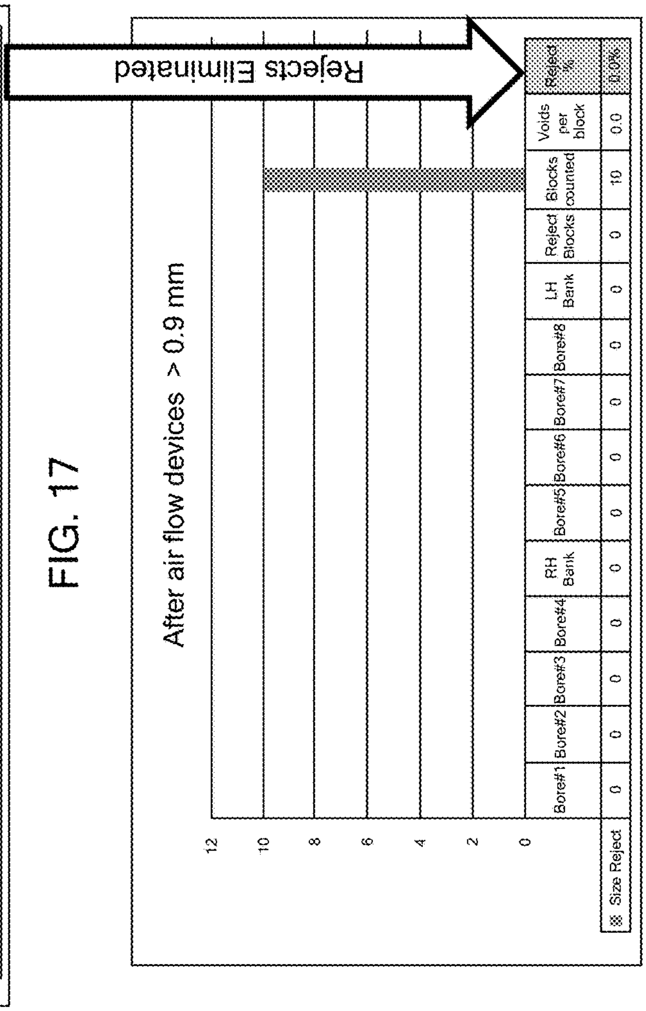
FIG. 18 is a bar chart showing occurrence rate of voids in a final bore surface of two banks and the rejection rate when an air flow device of the present disclosure is used, with a size of a rejection being greater than 0.9 mm.

FIGS. 17 and 18 are bar charts similar to FIGS. 15 and 16, except that with a size of a rejection is greater than 0.9 mm. The rejection rate is reduced from 10.3% to 0.0%.

Figure 19:
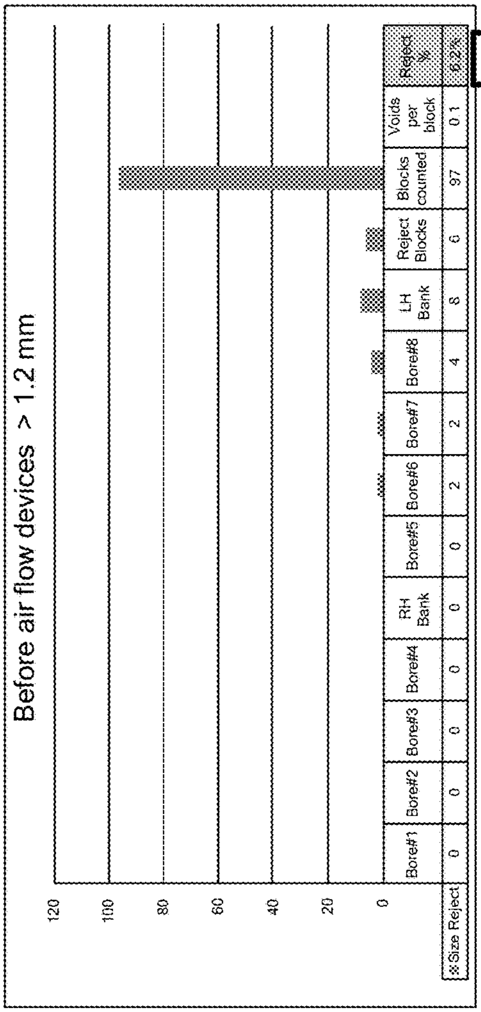
FIG. 19 is a bar chart showing occurrence rate of voids in a final bore surface of two banks and the rejection rate without using any air flow device, with a size of a rejection being greater than 1.2 mm.
Figure 20:
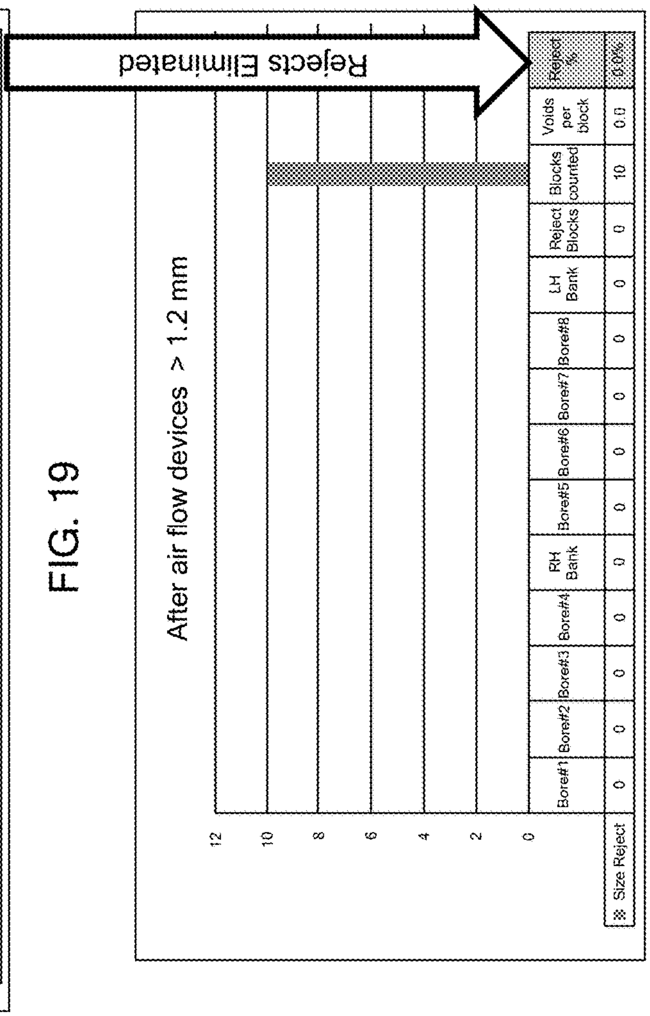
FIG. 20 is a bar chart showing occurrence rate of voids in a final bore surface of two banks and the rejection rate when an air flow device of the present disclosure is used, with a size of a rejection being greater than 1.2 mm.

FIGS. 19 and 20 are bar charts similar to FIGS. 15 and 16, except that with a size of a rejection is greater than 1.2 mm. The rejection rate is reduced from 6.2% to 0.0%.

Based on these comparisons as shown in FIGS. 15 to 20, it is clear that using the air flow device of the present disclosure can improve uniform coating of the molten materials onto the interior surfaces of the cylinder bores, thereby avoiding occurrence of voids in the coatings and reducing the rejection rate of the engine blocks.

With an air control device of the present disclosure, a more robust, consistent, and laminar air flow can be provided in the cylinder bores 14 during the thermal spray process. The laminar air flow can reduce the occurrence of non-conforming voids in the coated surface of the cylinder bores, thereby reducing the scraped engine blocks. The air control device 20 can provide air flow that can be more manageable and targeted to the required areas within the cylinder block, resulting in a reduction in the non-conforming voids that would otherwise be present in the thermal-sprayed coating.

It should be noted that the disclosure is not limited to the embodiment described and illustrated as examples. A large variety of modifications have been described and more are part of the knowledge of the person skilled in the art. For example, the present disclosure is not limited to spraying an internal bore and may also be used to control air flow across any surface, including an external surface while remaining within the scope of the present disclosure. These and further modifications as well as any replacement by technical equivalents may be added to the description and figures, without leaving the scope of the protection of the disclosure and of the present patent.

What is claimed is:

1. A method of applying a coating on a surface of a bore, comprising:

applying, by a torch, the coating on the surface of the bore, the torch being inserted from a first end of the bore;

directing a fluid through a duct; and dividing the fluid exiting the duct into a plurality of fluid portions by a plurality of cannons that are disposed adjacent and downstream from the duct and upstream from the torch, each of the plurality of cannons defining a single outlet, only one of the plurality of cannons being inserted into the bore and the only one of the plurality of cannons being inserted into a second end of the bore opposing the first end; and directing only one of the plurality of fluid portions into the bore toward the coating when the torch is applying the coating on the surface of the bore.

2. The method according to claim 1, further comprising dividing the fluid into a plurality of flows by the duct outside the bore.

3. The method according to claim 2, wherein the plurality of flows divided by the duct are directed into the plurality of cannons.

4. The method according to claim 1, wherein the step of directing the fluid through the duct comprises directing the fluid through a plurality of passageways separated by cross-members in the duct.

5. The method according to claim 4, further comprising directing the fluid through the plurality of cannons into a plurality of bores after the fluid is divided by the plurality of fluid passageways, wherein the bore is one of the plurality of bores.

6. The method according to claim 4, wherein the plurality of passageways correspond to the plurality of cannons.

7. The method according to claim 1, further comprising rotating the plurality of cannons to position the plurality of cannons relative to the torch.

8. The method according to claim 1, wherein the bore is one of a plurality of bores in an engine block, the method further comprises:

spraying the coating on a surface of some of the plurality of bores, the number of the some of the plurality of bores being "N−1";

directing the fluid through the plurality of cannons, a number of the plurality of cannons being "N".

9. A method of controlling deposition of material from at least one plasma transferred wire arc (PTWA) torch within at least one bore comprising:

directing a fluid through a duct;

dividing the fluid exiting the duct into a plurality of fluid portions by a plurality of cannons that are disposed adjacent and downstream from the duct and upstream from the at least one PTWA, each of the plurality of cannons defining a single outlet, only one of the plurality of cannons being disposed into each of the at least one bore, the at least one PTWA torch being inserted into a first end of the at least one bore, the only one of the plurality of cannons being inserted into a second end of each of the at least one bore opposing the first end; and directing one of the plurality of fluid portions into a corresponding one of the at least one bore and past a corresponding one of the at least one PTWA torch, and a number of the at least one bore within which the at least one PTWA torch is spraying is smaller than a number of the plurality of cannons.

10. The method according to claim 9, wherein the fluid is a gas consisting of air.

11. The method according to claim 9, wherein the step of directing the fluid through the duct comprises directing the fluid through a plurality of fluid passageways separated by cross-members in the duct.

12. The method according to claim 9 further comprising moving the duct and the plurality of cannons to a standby position while positioning a second duct and second cannons to an active position.

13. The method according to claim 12, wherein the moving is one of a rotational and translational movement.

14. The method according to claim 9, wherein the fluid is drawn from the duct through the cannons and into a plurality of bores, a number of the plurality of bores through which the fluid is drawn being "B" while a number of the plurality of bores within which the least one PTWA torch is spraying is "B−1".

15. A method of controlling deposition of material from at least one plasma spraying torch comprising the steps of:

disposing the at least one plasma spraying torch into at least one bore having opposing first and second ends, each of the at least one plasma spraying torch being inserted into the first end of only one of the at least one bore;

directing a fluid through a duct; and dividing the fluid exiting the duct into a plurality of fluid portions by a plurality of cannons that are disposed adjacent and downstream from the duct and upstream from the at least one plasma spraying torch, each of the plurality of cannons defining a single outlet, only one of the plurality of cannons being inserted into the second end of each of the at least one bore; and bore and then past a corresponding one of the at least one plasma spraying torch while the at least one plasma spraying torch is spraying a surface downstream from some of the plurality of cannons.

16. The method according to claim 15, wherein the fluid is a gas consisting of air.

17. The method according to claim 15 further comprising moving the duct and the cannons to a standby position while positioning a second duct and second cannons to an active position.

18. The method according to claim 15, wherein the step of directing the fluid through the duct comprises directing the fluid through a plurality of fluid passageways separated by cross-members in the duct.

* * * * *